(12) United States Patent
Saiz

(10) Patent No.: US 6,378,803 B1
(45) Date of Patent: Apr. 30, 2002

(54) AIRCRAFT LIFT ARRANGEMENT

(76) Inventor: Manuel Munoz Saiz, San Emilio 16, 1, 3, Madrid (ES), 28017

( * ) Notice: Subject to any disclaimer, the term of this patent is extended or adjusted under 35 U.S.C. 154(b) by 0 days.

(21) Appl. No.: 09/604,492

(22) Filed: Jun. 27, 2000

(51) Int. Cl.[7] .................................................. B64C 1/00
(52) U.S. Cl. ...................................................... 244/36
(58) Field of Search ................................ 244/34 R, 13, 244/36, 12.1, 35 A, 119

(56) References Cited

U.S. PATENT DOCUMENTS

| | | | | | |
|---|---|---|---|---|---|
| 6,053,453 A | * | 4/2000 | Saiz | ............................ | 244/36 |
| 6,082,668 A | * | 7/2000 | Saiz | ............................ | 244/36 |
| 6,098,922 A | * | 8/2000 | Hahl | ............................ | 244/36 |
| 6,138,946 A | * | 10/2000 | Saiz | ............................ | 244/13 |

* cited by examiner

Primary Examiner—Charles T. Jordan
Assistant Examiner—Gabriel Sukman
(74) Attorney, Agent, or Firm—Robert M. Schwartz

(57) ABSTRACT

An aircraft lift arrangement that has a fuselage, wings, a nose, a tail and a landing gear and comprises a stretched, flattened fuselage which produces the lift both during forward movement and in side winds, the bottom of which is preferably flat and the top rounded, with narrow lengthened wings used mainly to carry the engines and provide the flight control surfaces, the nose inclined with a positive leading angle, the bottom surface flat and the top rounded, and the tail sloping downward, its lower surface flat and the top rounded, to prevent release of the limit layer in the upper areas, with large leading angles. The landing gear is moved rearward somewhat to allow greater nose pitch up attitude during takeoff and landing.

13 Claims, 4 Drawing Sheets

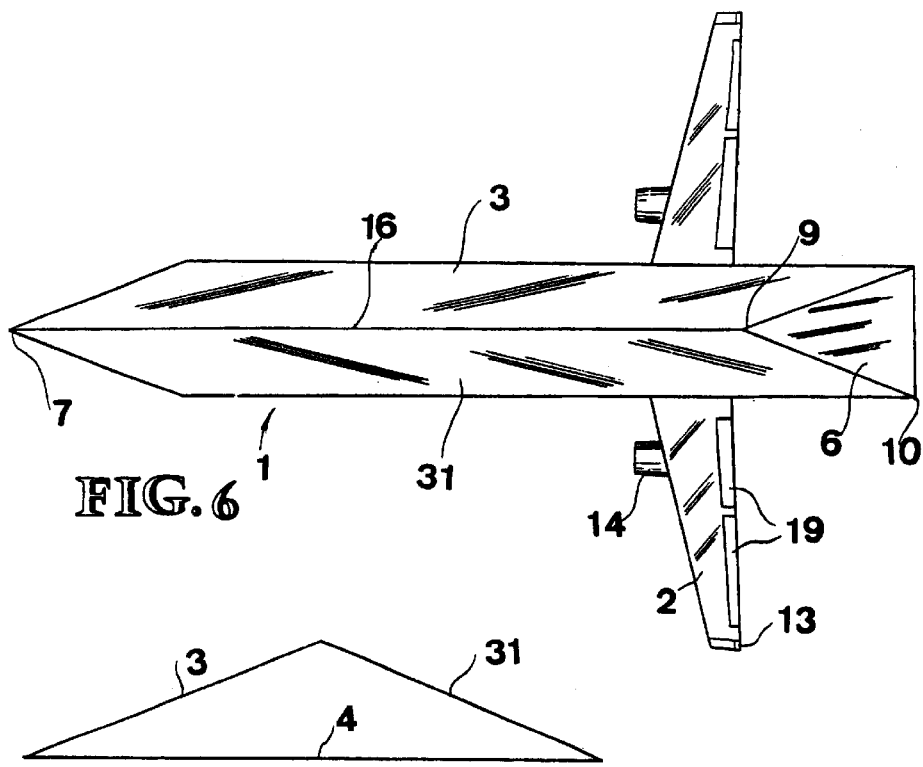
FIG. 6
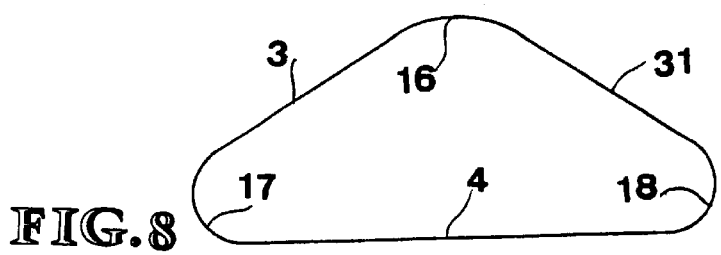
FIG. 7
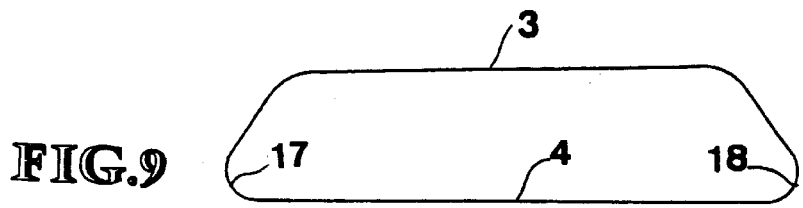
FIG. 8
FIG. 9

AIRCRAFT LIFT ARRANGEMENT

CROSS REFERENCES TO RELATED APPLICATIONS

This patent claims the priority date of Spanish Patent P9902785 filed on Dec. 20, 1999. The basis for priority in this case is the Paris Convention for the Protection of Industrial Property (613 O.G. 23, 53 Stat 1748). The Spanish patent application was filed in the Official Patent and Trademark Office of Spain.

BACKGROUND OF THE INVENTION

1. Field of the Invention

In aircraft lift systems.

2. Description of the Related Art

This patent is a partial continuation of Spanish patents P9601904, P9701753 and P9900680, at present, aircraft fuselages have the drawback that they do not make use of side winds to provide lift, and they also offer significant side resistance and do not produce the majority of the lift on the fuselage. That is all reduced in part with this invention.

BRIEF SUMMARY OF THE INVENTION

The aircraft lift arrangement consists of a stretched, flattened fuselage which produces the lift both during forward movement and in side winds, the bottom of which is preferably flat and the top rounded, with narrow lengthened wings used mainly to carry the engines and provide the flight control surfaces, the nose inclined with a positive leading angle, the bottom surface flat and the top rounded, and the tail sloping downward, its lower surface flat and the top rounded, to prevent release of the limit layer in upper areas, with large leading angles. The landing gear is moved rearward somewhat to allow greater nose pitch up attitude during takeoff and landing.

Said narrow, lengthened wings can be fitted forward, in the centre or rearward: in the latter case, they can carry the stabilizers and elevators.

Except at the nose and tail, the whole fuselage can have a constant transverse cross-section which is flattened oval, flattened trapezoid, circle segment or triangular and with rounded corners or edges, to reduce the effect of side wind and to produce lift in such winds.

The fuselage may be slightly curved lengthwise and the front of the nose and the rearmost part of the tail are inclined so as to tend to align the slipstream.

The flattened design of the fuselage for side wind conditions can also be used for the same purposes with the roughly rounded fuselages of conventional aircraft, making them a more flattened design.

The unions between surfaces must be rounded.

Operation: the slipstream meets the lower surface of the fuselage to create lift with large leading angles so that part of the air flows to the upper rounded surface and leaves the fuselage at the tail. Side wind or better still its component is exploited by giving a small positive lateral leading angle to provide the corresponding lift.

BRIEF DESCRIPTION OF THE DRAWINGS

FIG. 6 shows a schematic side view of a variant of aircraft.

FIGS. 7 to 13 show various transverse cross-sections of different fuselages.

DETAILED DESCRIPTION OF THE INVENTION

Figure 1:
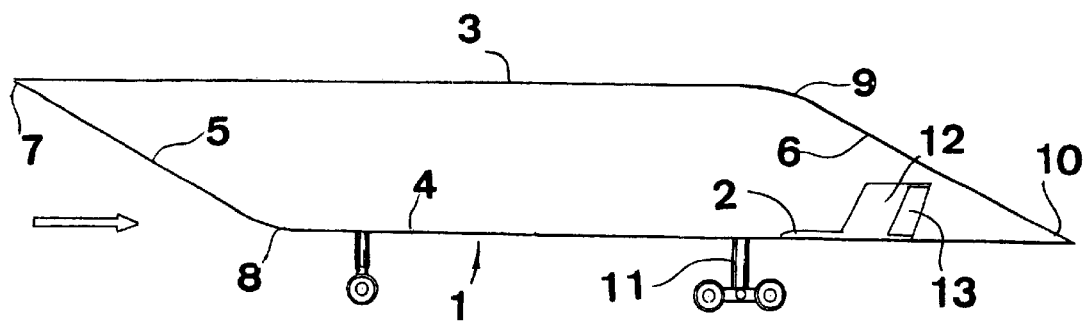
FIG. 1 shows a side, schematic view of an aircraft with the arrangement of the invention.

FIG. 1 consists of the fuselage 1, the narrow lengthened and rearward wing 2, the upper curved fuselage surface 3, the bottom surface flat fuselage surface 4, the front, flat inclined surface 5 between the upper tip of the nose 7 and the bottom part 8, the rear curved surface 6 between the upper zone 9 and the bottom tip of the tail 10, the rearward landing gear 11, the winglet 12 and the control surface 13.

Figure 2:
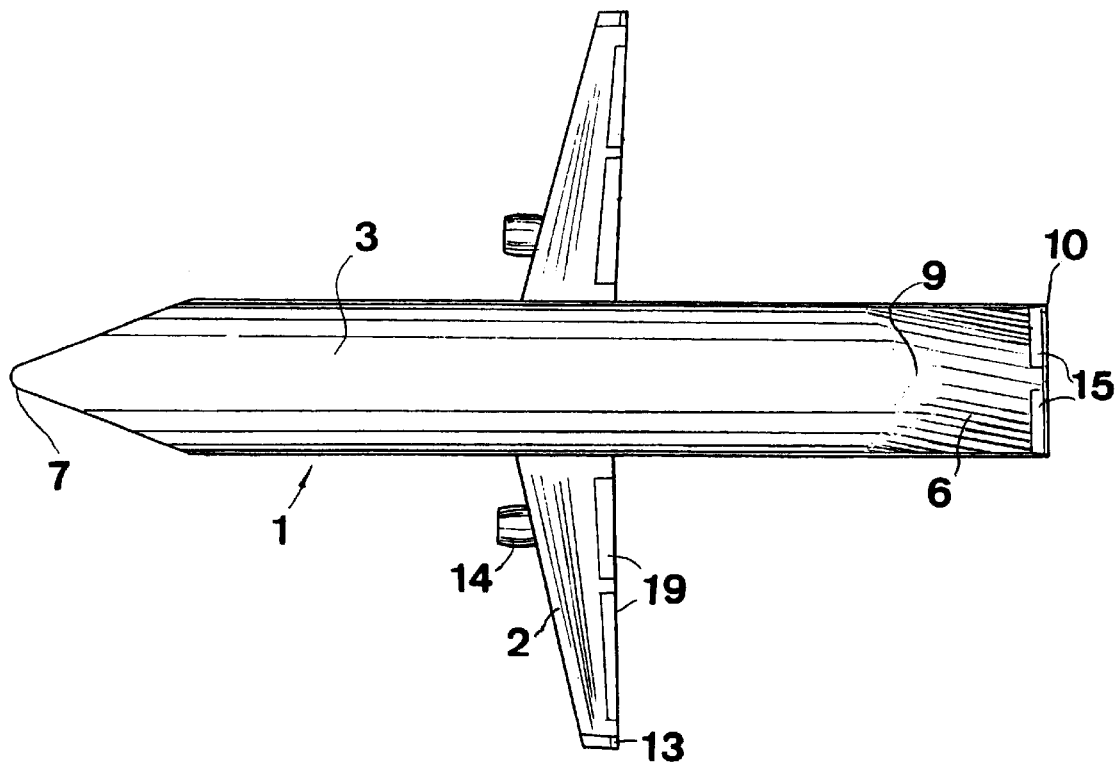
FIG. 2 shows a schematic top view of the aircraft of the invention.

FIG. 2 consists of the fuselage 1, the narrow lengthened and center wing 2, the upper curved fuselage surface 3, upper tip of the nose 7 and the curved surface 6 between the upper zone 9 and the bottom tip of the tail 10, the control surfaces 13 and 15.

Figure 3:
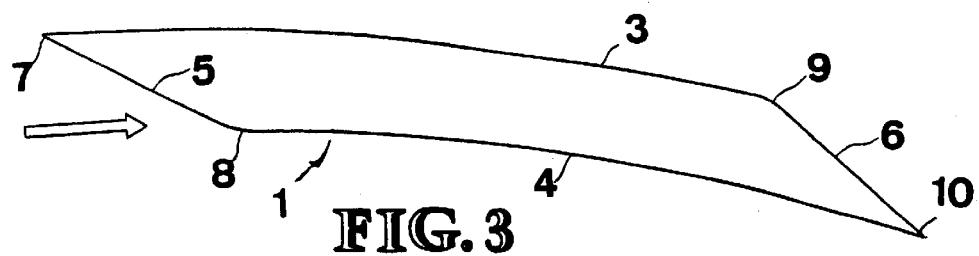
FIG. 3 shows a schematic side view of a variant of the invention.

FIG. 3 consists of the fuselage 1, the upper curved fuselage surface 3, the bottom curved fuselage surface 4, the front flattened and inclined surface 5 between the upper tip of the nose 7 and the bottom part 8, the rear curved surface 6 between the upper zone 9 and the bottom tip of the tail 10, with the fuselage curved lengthwise.

Figure 4:
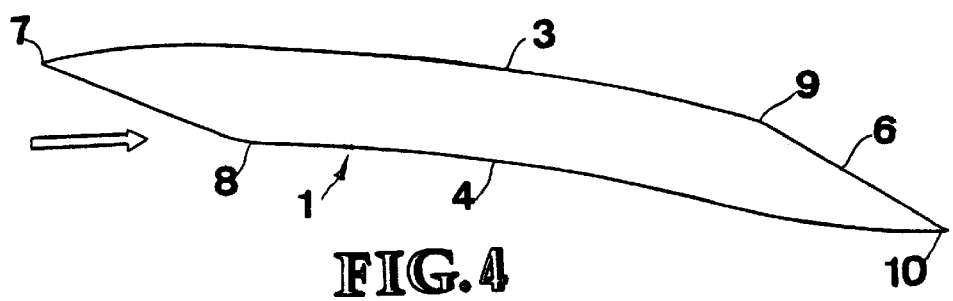
FIG. 4 shows a schematic side view of another variant of the invention.

FIG. 4 consists of the fuselage 1, the upper curved fuselage surface 3, the bottom curved fuselage surface 4, the front flattened and inclined surface 5 between the upper tip of the nose 7 and the bottom part 8, the rear flattened or curved surface 6 between the upper zone 9 and the bottom tip of the tail 10, with the fuselage curved lengthwise, the front part of the nose and the rear part of the tail have an inclination that is aligned with the ram air flow.

Figure 5:
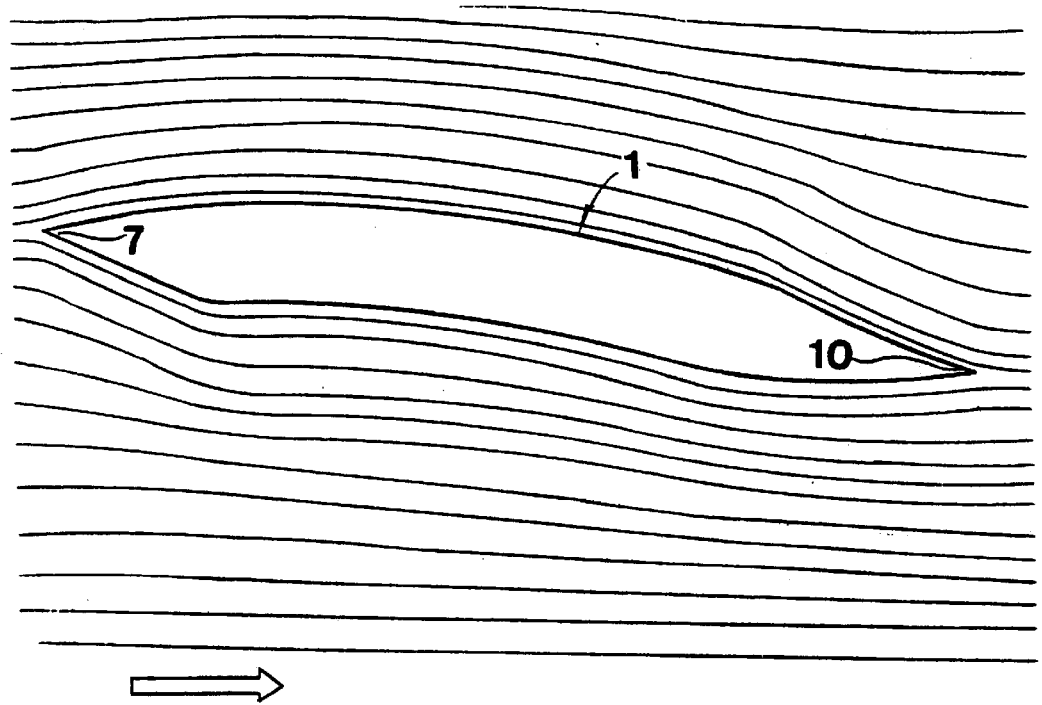
FIG. 5 shows a schematic side view of a fuselage with the slipstream lines.

FIG. 5 consists of the fuselage 1, it can be notice that the air flow meets the tip of the nose 7 and surrounds the fuselage leaving it at the tail 10, it causes the downward displacement of the flow and thus the fuselage react upward.

FIG. 6 consists of the transverse triangular cross-section fuselage 1, the narrow lengthened and rearward wing 2, the upper curved fuselage surface 3 and 31, and their union line 16, the upper tip of the nose 7, the curved surface 6 between the upper zone 9 and the bottom tip of the tail 10, the control surfaces 13 and 19.

FIG. 7 shows the triangular transverse cross-section of the fuselage shown in FIG. 6.

FIG. 8 shows the triangular transverse cross-section of the fuselage shown in FIG. 6 with their edges rounded.

FIG. 9 shows a flattened, trapezoid transverse cross-section fuselage with their edges rounded and its upper surface 3 and 4 flattened.

Figure 10:
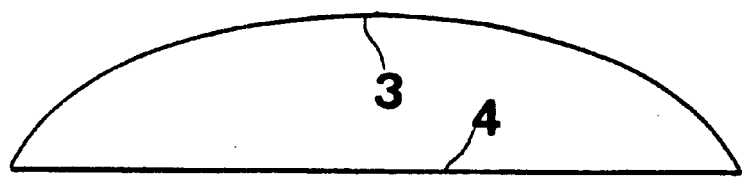

FIG. 10 shows the circle segment transverse cross-section of the fuselage formed by the upper 3 and lower 4 surfaces.

Figure 11:
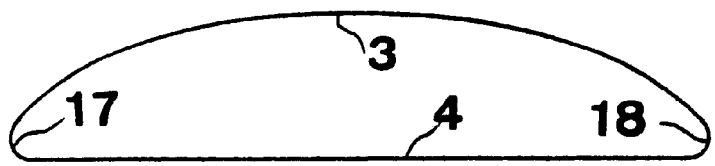

FIG. 11 shows the circle segment transverse cross-section of the fuselage formed by the upper 3 and lower 4 surfaces, with their side edges 17 and 18 rounded.

Figure 12:
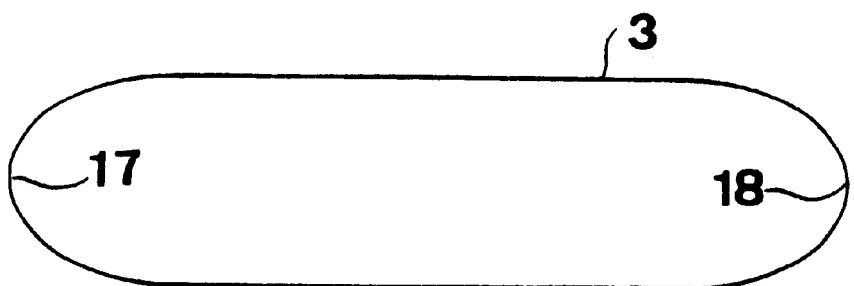

FIG. 12 shows the roughly oval transverse cross-section of the fuselage with the flattened upper 3 and lower 4 surfaces, with their side edges 17 and 18 rounded.

Figure 13:
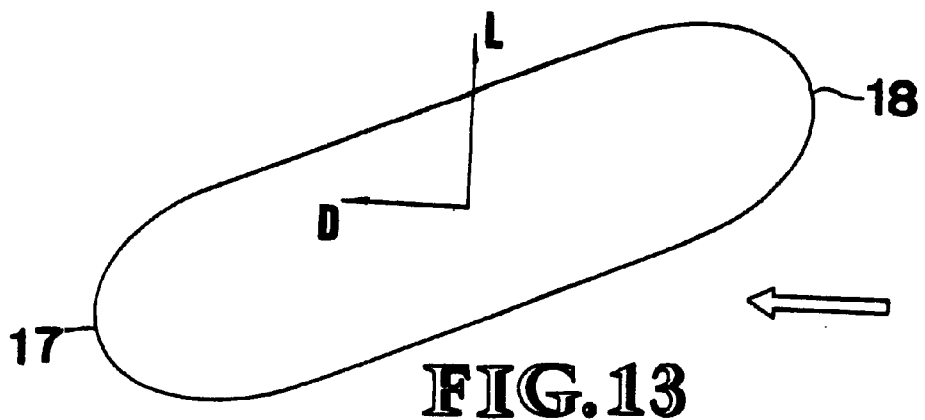

FIG. 13 shows the fuselage of the FIG. 12 laterally inclined in such a way that the side winds or its component meets the edge 18 of the fuselage leaving it at the edge 17, creating lift L that allows using a lower power and thus reducing fuel consumption and a side resistance D that is lower than in conventional aircrafts.

The arrows indicate the airflow with reference to the aircraft fuselage.

Advantages: it is the only system that exploits the side winds or better still their transverse component to provide the corresponding lift and providing most of the lift in the fuselage, all that in a simple and inexpensive way.

What I claim is:

1. An aircraft lift arrangement which produces the lift both during forward movement and in side winds comprising:
   - a stretched flattened fuselage which produces the lift bond during forward movement and in side winds, the bottom of which is preferably flat and the top rounded;
   - thin lengthened side fins used mainly to carry the engines and provide the flight control surfaces;
   - a nose inclined with a positive large angle, the bottom surface flat and the top rounded;
   - a tail sloping downward, with its lower surface flat and the top rounded, to prevent release of the limit layer in upper areas, with large leading angles; and
   - a main landing gear that is close to the tail to allow greater nose pitch up attitude during takeoff and landing.

2. An aircraft lift arrangement according to claim 1, wherein the thin lengthened side fins are fitted in the center zone of the fuselage.

3. An aircraft lift arrangement according to claim 1, wherein the thin lengthened side fins are fitted at the rear of the fuselage.

4. An aircraft lift arrangement according to claim 1, wherein the fuselage has a triangular transverse cross-section.

5. An aircraft lift arrangement according to claim 1, wherein the fuselage has a triangular transverse cross-section with its side edges rounded.

6. An aircraft lift arrangement according to claim 1, wherein the fuselage has a flattened trapezoid transverse cross-section, with its edges rounded and with the upper (3) and bottom (4) surfaces flattened.

7. An aircraft lift arrangement according to claim 1, wherein the fuselage has a circle segment transverse cross-section formed by the upper (3) and bottom (4) surfaces.

8. An aircraft lift arrangement according to claim 1, wherein the fuselage has a circle segment transverse cross-section formed by the upper (3) and bottom (4) surfaces, with their edges rounded.

9. An aircraft lift arrangement according to claim 1, wherein the fuselage is flattened and formed by the flat upper (3) and bottom (4) surfaces, with their edges (17) and (18) rounded.

10. An aircraft lift arrangement according to claim 1, wherein the fuselage is slightly curved lengthwise.

11. An aircraft lift arrangement according to claim 1, wherein the fuselage takes the shape of a flattened conventional aircraft.

12. An aircraft lift arrangement according to claim 1, wherein the unions between fuselages surfaces are rounded.

13. An aircraft lift arrangement according to claim 1, wherein the fuselage has a constant transverse cross-section between the most rear zone of the nose and the beginning or most forward zone of the tail.

* * * * *